United States Patent [19]
Manassen et al.

[11] 4,064,326
[45] Dec. 20, 1977

[54] PHOTO-ELECTROCHEMICAL CELL CONTAINING CHALCOGENIDE REDOX COUPLE AND HAVING STORAGE CAPABILITY

[75] Inventors: Joost Manassen; Gary Hodes; David Ferdinand Cahen, all of Rehovot, Israel

[73] Assignee: Yeda Research & Development Co. Ltd., Rehovot, Israel

[21] Appl. No.: 771,317

[22] Filed: Feb. 23, 1977

[30] Foreign Application Priority Data

Mar. 3, 1976   Israel .................................... 49147

[51] Int. Cl.$^2$ ............................................ H01M 6/36
[52] U.S. Cl. ................................... 429/111; 204/86; 204/92; 204/56 R; 204/96
[58] Field of Search ........................................ 429/111

[56] References Cited
PUBLICATIONS

H. Gerischer "Electrochemical Photo and Solar Cells", J. Electro-analytical & Interfacial Electrochem, vol. 58, pp. 263-274 (1975).
A. Fujishima et al., "Photosensitized Electrolytic Oxidation of Iodide Ions on CdS Single Crystal Electrode", Bull. Chem. Soc. Japan, vol. 44, p. 304 (1971).
T. S. Jayaderaiah, "Semiconductor-Electrolyte Interface Devices for Solar Energy Conversion", Appl. Phys. Lett., vol. 25, pp. 399-400, (1974).
W. W. Anderson et al., "Becquerel Effect Solar Cell", Energy Conversion, vol. 15, pp. 85-94, (1976).

Primary Examiner—T. Tung
Assistant Examiner—Aaron Weisstuch
Attorney, Agent, or Firm—Browdy and Neimark

[57] ABSTRACT

Novel devices for the direct conversion of visible light to electricity, termed Photo Electrochemical Cell (PEC), said PEC comprising as one electrode a semiconductor of the n- or p- type of suitably wide bandgap for efficient utilization of solar energy in combination with an additional electrode and an electrolyte comprising a chalcogenide redox couple; according to a preferred embodiment, the additional electrode being a storage electrode adapted to supply converted energy as electricity when the photoelectrode is not illuminated.

18 Claims, 8 Drawing Figures

Direction of Illumination

Direction of Illumination

PHOTO-ELECTROCHEMICAL CELL CONTAINING CHALCOGENIDE REDOX COUPLE AND HAVING STORAGE CAPABILITY

FIELD OF THE INVENTION

The invention relates to novel devices for the direct conversion of visible light to electricity by means of a novel Photo-Electrochemical Cell (termed PEC). According to a preferred embodiment of the invention, means are provided in said cell for storing in situ part or all of the electrical energy generated in the cell. The invention also relates to a novel system of photoelectrodes and electrolytes which substantially prevent corrosion of the electrode. When part or all of the generated electrical energy is to be stored in the cell, a storage electrode or electrode system is provided. Other and further aspects of the invention will become apparent hereinafter.

STATE OF THE PRIOR ART

Becquerel described the photo electric effect which takes place when an AgCl-covered Pt electrode connected with a counter electrode and dipped into an electrolyte solution is illuminated (E. Becquerel, Comp. Rend. Ac. Sci. 9, 561 {1839}). Upon illumination of the electrode, electrical current passes through the circuit comprising the system AgCl/electrolyte/counterelectrode, when the two electrodes are connected by way of an external load.

Similar cells have since been described wherein various elemental and compound semiconductors are used as photoactive electrodes. However, only wide band gap oxide-semiconductors, such as $Ta_2O_5$ (W. Ch. van Geel et al. Philips Res. Repts. 13, 265 {1958}), $TiO_2$ (A. Fujishima et al. Nature 238, 37 {1972}, $Sb-SnO_2$ (M. S. Wrighton et al. J. Amer. Chem. Soc. 98,44 {1976}), and $WO_3$ (G. Hodes et al. Nature, 260,312 {1976}) have been found to be stable photoelectrodes. Devices containing such electrodes can utilize only U. V. or near-U. V. radiation and, therefore, these are unsuitable for solar energy conversion. With most other electrodes used in such devices, irreversible (electro) chemical reaction of the electrode material itself takes place, i.e., the electrode is attacked by the electrolyte and/or the redox couple present in the electrolyte. Such is the case for CdS, Si, Ge, GaP and others (H. Gerischer, J. Electroanal. Interfac. Electrochem. 58,263 {1975}). No devices were described which are able to store the converted energy for subsequent use.

SUMMARY OF THE INVENTION

The invention relates to a novel photo-electrochemical cell (PEC) adapted to convert visible light, such as solar light, to electrical energy. According to a preferred embodiment of the invention, means are provided in the PEC to store part or all of the generated electrical energy so that this can be used subsequently, when desired, when the photoelectrode is not illuminated. The novel PEC according to the present invention comprises a photoactive semiconductor electrode in contact with a suitable electrolyte comprising a suitable redox couple. The most simple embodiment of the novel PEC comprises two electrodes, one of them a photoactive one. When part or all of the energy is to be stored in the cell, a storage electrode is provided, as will be explained in detail hereinafter. The electrolyte of the novel PEC comprises a redox couple adapted to prevent corrosion effects of the photoactive electrode. Advantageously, the redox couple is a chalcogenide redox couple, the preferred one being $S/S^-$.

The novel cell disclosed here uses low band gap materials, enabling use of at least a ten times greater part of the solar spectrum than was previously possible. No irreversible chemical reactions take place on these materials in the new cell when they are used as photoelectrodes. In addition, by using an arrangement different from any described hitherto for a PEC, converted energy can be stored in the very cell used for conversion.

The additional electrode is advantageously of large effective surface area. Suitable electrodes are various forms of carbon, group VIII transition-metal-based electrocatalysts and combinations of these two, and preferred embodiments are high surface area carbon with or without the above-mentioned electrocatalysts, the electrocatalysts alone, on a suitable substrate or in a mechanical self-supporting form, platinum, or the like. The additional electrode may also be used as storage electrode, and in this case suitable materials and electrolyte systems must be used. Combinations of the two are also possible.

BRIEF DESCRIPTION OF THE DRAWINGS

The invention is illustrated with reference to the enclosed schematical drawings which are not according to scale and in which.

DETAILED DESCRIPTION OF THE PREFERRED EMBODIMENT

Figure 1:
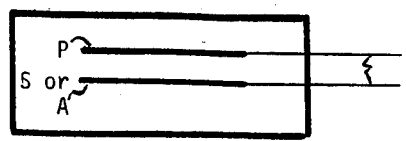
FIG. 1 is a PEC in its most simple embodiment.
Figure 1:
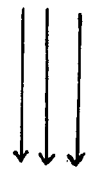

The simplest embodiment of the present invention is illustrated in FIG. 1 (see legend of the terms on Page 9). The cell shown in this Figure comprises a photoelectrode P and an additional electrode S or A which are immersed in the electrolyte which fills the cell. The mode of operation of the cell is described in greater detail in the following:

Important aspects of the present invention are the following:

a. Prevention of photo-electrode corrosion

Corrosion reactions of the photo-electrode are unwanted reactions and occur partly instead of the redox reaction that one wants to happen at its surface. We have found that this corrosion reaction is prevented by resorting to the use of the redox couples $S/S^-$, $Se/Se^-$ or $Te/Te^-$, which are known as "chalcogenide redox couples".

b. Storage of energy

According to a preferred embodiment of the present invention means are provided in the PEC for storing part or all of the energy generated due to the utilization and conversion of solar energy. This is done by means of a storage electrode, which has the property of being able to undergo a reversible redox reaction with the solution; or it can be in contact with a solution, components of which can undergo a reversible redox reaction. Part of or all the converted energy can be stored for subsequent use when the photo electrode is not illuminated.

In Table 1 some non-restrictive examples are given of corrosion-free photoelectrode/redox couple combinations:

Table 1

| Photoelectrode | redox couple |
| --- | --- |
| CdS | $S/S^{--}$ |
| $Bi_2S_3$ | $S/S^{--}$ |
| CdSe | $Se/Se^{--}$, $S/S^{--}$ |
| CdTe | $Te/Te^{--}$ |
| CdTe | $S/S^{--}$ |
| ZnSe | $S/S^{--}$ |

The components of the novel device are:

A. The Photoelectrode (P)

The photoelectrode preferably comprises a chalcogenide semiconductor of the n- or p- type. It can comprise any other suitable semiconductor which is protected against corrosion by suitable means, such as a chalcogenide redox couple.

The photoactive electrode, which can also be termed photoelectrode and which is shown in the figure as P is either a single crystal — or a polycrystalline layer applied to a suitable substrate. It can be a pure single or polycrystalline material. When the photoelectrode comprises a layer of a suitable semiconductor, it is advantageously applied to a suitable electrically conductive support or base which may be a suitable metal, conductive glass, or the like, resulting in an electrical contact to the semiconductor which is ohmic or nearly so and the application of the active layer is effected by means well-known in the art, such as sputtering, spraying, dipping, electrolysis, sublimation, etc. If the electrically conductive support is chemically and electrochemically rather inert with respect to the chalcogen/chalcogenide electrolyte, then its insulation from the solution is not critical. Such insulation, if necessary, may be effected by coating with a layer of tar or stable (with respect to the electrolyte) lacquer or paint.

The thickness of the semiconductor layer depends on the electrical resistivity of the semiconductor and should be such as to enable the photocurrent to flow without too great a loss in power. The width of the optical band gap of the semiconductor should be preferably between 1.0 and 2.5 eV, so that a reasonable part of the solar spectrum can be used. The contact between the semiconductor and the electrical connection or between the semiconductor layer and the conductive base should be as close to ohmic as possible. A thin insulating layer can be present between the semiconductor and the base and may even be beneficial, but its thickness should not exceed several tens of Angstroms, so as not to block the passage of electrical current.

In Table 2 some nonrestrictive examples are given of semi-conductors that can be used as electrode material, together with the width of their optical bandgaps. For clarity's sake the relationship between the energy unit, electronvolt, and the wave length unit, nanometer, is given in Table 3.

Table 2

| Semiconductor | Width of the optical[7] bandgap in eV |
| --- | --- |
| CdS | 2.4 |
| CdSe | 1.7 |
| CdTe | 1.45 |
| $Bi_2S_3$ | 1.3 |
| InSe | 1.2 |
| SnS | 1.3 |
| GaAs | 1.4 |
| $CuInS_2$ | 1.5 |

(M. Rodot, "Les Materiaux Semi-conducteurs" Dunod, Paris (1965), and W. H. Strehlow and E. L. Cook, J. Phys. Chem. Ref. Data 2, 163 (1973).

Table 3

Relation between energy units, electron volt (eV), and wavelength units nanometer (nm)

| eV | nm |
| --- | --- |
| 1.0 | 1240 |
| 1.5 | 830 |
| 2.0 | 620 |
| 2.5 | 495 |
| 3.0 | 415 |
| 3.5 | 355 |
| 4.0 | 310 |

B. The Electrolyte

The electrolyte is preferably an aqueous one for good electrical conductivity, but it can also be a suitable organic solvent, and it contains advantageously sulphide and sulphur. Selenide/selenium or telluride/tellurium can take the place of sulphide/sulphur; however, their deeply coloured solutions make them less desirable because of absorption of the solar radiation. The electrolyte and the electrodes do not contain, and are not in contact with molecular oxygen in order to prevent reactions involving oxygen at the electrodes which compete with those of the chalcogenide.

Table 4 shows some nonrestrictive examples of electrolyteredox couple combinations.

Table 4

| Electrolyte | Redox Couple |
| --- | --- |
| $H_2O/OH^-$ | $Se/Se^{--}$ |
| $C_2H_5OH$ | $S/S^{--}$ |
| $CH_3OH$ | $S/S^{--}$ |
| $H_2O/OH^-$ | $S/S^{--}$ |

C. The Additional Electrode

Besides the photo-electrode, at least one other electrode is present in the PEC to complete the current flow in the device.

1. The Storage Electrode(s)

This electrode may be employed to store part or all of the electricity produced. For this purpose the electrode undergoes a reversible redox change or is in contact with a compartment, containing or constituting a system that undergoes such a change or is a combination of these two. The electrochemical potential of the system or electrode that undergoes the change is between the chalcogen/chalcogenide potential and the potential of the photoelectrode(s) during illumination. It is often advantageous to separate this electrode from the chalcogen/chalcogenide solution by means of an ion selective membrane, but this is not always necessary. Table 5 shows some nonrestrictive examples of systems that can be used for storage.

Table 5

| Storage Electrode | Storage Compartment Solution | Redox Couple |
| --- | --- | --- |
| $Ag_{(s)}$ | $OH^- + S^{--}/H_2O$ | $2Ag_{(s)} + S^{--} = Ag_2S_{(s)} + 2e^-$ |
| Inert | $OH^- + S^{--} + Se/H_2O$ | $Se + 2e^- = Se^{--}$ |
| $MnO_{2(s)}$ | $OH^-/H_2O$ | $MnO_{2(s)} + 4OH^- = MnO_4^{--} + 2H_2O + 2e^-$ |
| $FeO(OH)_{(s)}$ | $OH^-/H_2O$ | $FeO(OH)_{(s)} + H_2O + e^- = Fe(OH)_{2(s)} + OH^-$ |
| $Sn_{(s)}$ | $OH^- + S^{--}/H_2O$ | $Sn_{(s)} + S^{--} = SnS_{(s)} + 2e^-$ |
| FeS | $OH^- + S^{--}/H_2O$ | $2FeS_{(s)} + S^{--} = Fe_2S_{3(s)} + 2e^-$ |
| Hg | $OH^- + S^{--}/H_2O$ | $Hg_{(s)} + S^{--} = HgS_{(s)} + 2e^-$ |
| Sn(s) | $OH^-/H_2O$ | $Sn + 5OH^- = HSnO_3^- + 2H_2O + 4e^-$ |
| Zn(s) | $OH^-/H_2O$ | $Zn + 2OH^- = Zn(OH)_2 + 2e^-$ |

2. The Auxiliary Electrode (A)

Figure 2:
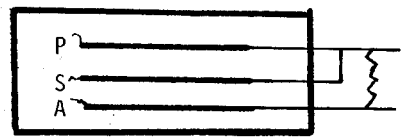
FIG. 2 is a PEC comprising both an auxiliary and a storage electrode.

This electrode can be used directly with the photoelectrode only (FIG. 1) or in combination with both a photoelectrode and a storage electrode as shown in FIG. 2. In such a configuration the PEC will, upon illumination, charge the storage electrode and part of the converted energy will go as electricity over the load to the auxiliary electrode. The resistance of the load will determine the relative part of directly used and stored converted energy. In the dark the storage electrode will discharge over the load to the auxiliary electrode by which a continuous use of the device is possible in the light as well as in the dark.

The auxiliary electrode is polarized minimally upon current flow. This can be attained by using high surface area materials and also the addition of electrocatalysts may be beneficial as will be clear to those skilled in the electrochemical art. The electrode is inert and does not undergo chemical changes. If, for example, stainless steel gauze is used as a support for the auxiliary electrode, the gauze itself may function as the electrical load without the need for insulating it from the solution, since stainless steel is chemically and electrochemically rather inert in the solutions used under all conditions which will occur in such photoelectrochemical cells as have been aforementioned.

Table 6

Some examples of materials suitable as auxiliary electrodes:

High surface area carbon on stainless steel gauze;
Porous carbon;
Carbon/cobaltous salt mixture bonded (e.g., with Teflon or polyethylene resin) to stainless steel gauze;
Cobalt or nickel sulfide;
Porous carbon containing nickel or cobalt;
Platinized Platinum;
Combinations of these.

DESCRIPTION OF THE PREFERRED EMBODIMENTS

The following illustrates some of the embodiments of the invention. The following symbols are used:

P = Photoelectrode
S = Storage electrode
A = Auxiliary electrode
⚡ = Load
n-P = n-type semiconductor photoelectrode
p-P = p-type semiconductor photoelectrode

A. P⚡S

This is illustrated in FIG. 1. When the photoelectrode is connected with the storage electrode over a load, current will flow in one direction upon illumination and in the reverse direction in the dark.

B. P⚡A

This is illustrated in FIG. 1, but the photoelectrode is connected with A over a load. Current will flow upon illumination only, and all the converted energy will be used directly as electricity, and no current will flow in the dark.

C. PS⚡A

This is illustrated in FIG. 2. Current will flow in the same direction, both under illumination, as well as in the dark. It is preferable, but not necessary, to add a rectifier or photoconductive element to the circuit between P and S. Another load can also be added between P and S in order to give the required balance between storage and direct electricity production.

D₁. $P_A P_B$⚡A

Figure 3A:
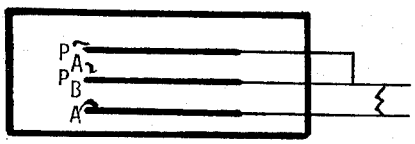
FIGS. 3a and 3b are other embodiments of a PEC with a multiple photoelectrode.

This is illustrated in FIG. 3 (a). The two photoactive electrodes $P_A$ and $P_B$ are connected to the same auxiliary electrode. The optical band gap of $P_A$, which is present as a layer on a conducting transparent material, such as conductive glass, is larger than that of $P_B$. The result is that radiation which is not absorbed by $P_A$ hits $P_B$ and is also utilized for energy conversion. Because of physical reasons, wide band gap semiconductors may give good voltages, but low currents and small band gap semiconductors may give good currents at low voltages. This embodiment gives the possibility to combine high voltage with high current. In Table 7 some nonrestrictive examples are given of semiconductor combinations that can be used in this embodiment.

Table 7

| $P_A$ | $P_B$ |
| --- | --- |
| CdS | CdTe |
| ZnSe | CdSe |
| CdS | $Bi_2S_3$ |
| CdS | CdSe |

D₂. $P_A$⚡$A_B$/$P_B A_A$

This is illustrated in FIG. 3 (b). Here two photoactive electrodes operate each in their own electrolyte solution. In this embodiment the two electrolyte solutions A and B can, and beneficially are, different. The two P. E. C.'s are electrically cross-linked, i.e., $P_A$ and $A_B$ and $P_B$ to $A_A$. $P_A$ and $P_B$ fulfill the same requirements as in Embodiment D₁. The result of cross-connection of the cells is that $P_B$ will bias the auxilliary electrode of $P_A$ and hence will increase the photovoltage that can be obtained. The current obtainable in this case is the lowest one of the photocurrents that can be generated by the two P. E. C.'s operating alone. However, in this embodiment photoactive electrodes that operate in for example S/S=solution only can be used in conjunction with those that operate in simple aqueous solutions. This is so because there is no contact between the two electrolytes except the external electrical connection. If electrolyte A is, for example, a simple basic aqueous solution (OH−/H₂O), then it is possible by the use of a suitable auxilliary electrode $A_A$, such as Ni, to effect the photoelectrolysis of water, without the need for an additional external bias, which will be provided by $P_B$. If, for example, n - TiO₂ is used as $P_A$, then oxygen is evolved at $P_A$ and hydrogen at $A_A$.

D₃. $P_A$⩕$P_B/A_AA_B$

The two cells are connected in parallel and not in series as in D₂. The current obtainable in this embodiment under illumination will be the sum of the two photocurrents obtained from each cell operating separately. The photovoltage obtainable will lie between that which each cell generates when operating separately, and the actual value will be determined by the relative current contribution of each cell. Both cells and photoelectrodes fulfill the same requirements as in Embodiment D₂.

D₄. $P_A$⩕$A_A/P_B$⩕$A_B$

Two cells with different electrolytes, A and B, are combined, but not interconnected. Electrical power is obtained from each cell, separately. $P_A$ and $P_B$ fulfill the same requirements as in Embodiment D₁.

In Table 7B some nonrestrictive examples are given of semiconductor combinations that can be used in Embodiments D₂, D₃, and D₄.

Table 7B

| $P_A$ | $P_B$ |
|---|---|
| TiO₂ | CdSe |
| WO₃ | CdTe |
| α-Fe₂O₃ | Bi₂S₃ |
| TiO₂ | CdS |
| α-Fe₂O₃ | CdTe |

E. n-P⩕p-P

Figure 4A:
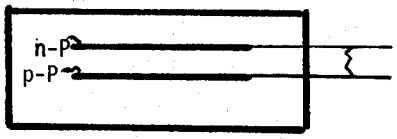
FIG. 4a and FIG. 4b are different embodiments of PEC's.
Figure 4B:
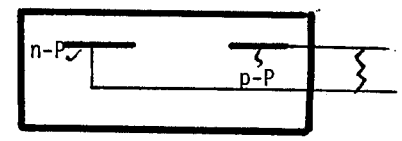

This is illustrated in FIGS. 4a and 4b. Because the photovoltages of an n-type and a p-type semiconductor are of a different sign, a combination of the two gives a higher voltage output than is obtained with any of them alone. FIG. 4a shows the case when the optical bandgap of n-P is wider than that of p-P and n-P is brought on a transparent base. If both bandgaps are comparable, the possibility shown in FIG. 4b has to be used. Here the auxiliary electrode is also photoactive.

F. (PA)$_n$⩕S

Figure 5:
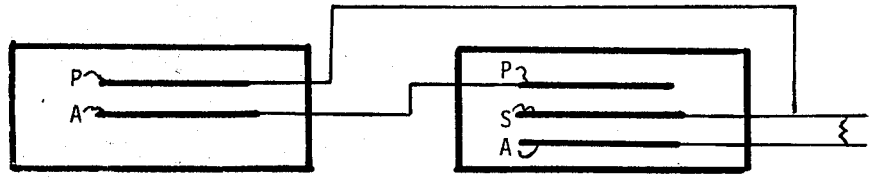
FIG. 5 is a multi-cell system of PECs.

This is illustrated in FIG. 5. Several PECs are connected in series, and only the last one contains a storage electrode. The great advantage of this embodiment is the higher voltage output under illumination, as well as in the dark. Because of the higher voltage, less material is needed for storage.

These examples are not exhaustive, and other embodiments can be devised by combination of the ones illustrated.

EXAMPLE 1 a. A solution was prepared of 30 mg of SeO₂ and 220 mg of CdSO₄ in 25 ml of 2N H₂SO₄. Two platinum electrodes of 1 cm² each were immersed into the solution, and a current of 7 mA at 2.6 V was passed for 15 minutes. Because of this treatment a codeposition of Cd and Se occurs on the cathode. This cathode was then heated at 600° C in a stream of an inert gas for 15 min. It was then immersed into 5 ml of a solution which was 1M in OH−, S−−, and S and was connected with another electrode which was prepared by precipitating 100 mg of activated carbon on 4 cm² of carbon cloth. The solution was thoroughly deaerated.

Figure 6:
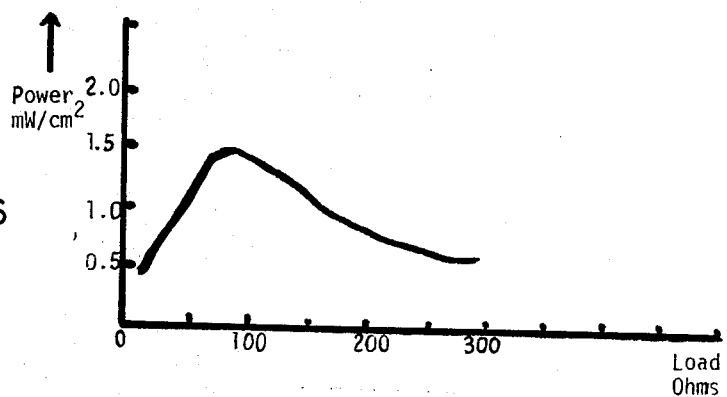
FIG. 6 shows the relation between power and load of a PEC as shown in FIG. 1, comprising a CdSe layer as the photoelectrode, an aqueous electrolyte, the $S/S^-$ redox couple and activated carbon on carbon cloth as the auxiliary electrode.

The photoactive CdSe electrode was then illuminated with a tungsten/iodine light source which was arranged in such a way that light reaching the electrode had an intensity comparable to that of sunlight, i.e., 100 mW/cm². Under these conditions an open circuit voltage of 520 mV was registered and a closed circuit current of 8 mA/cm². FIG. 6 gives the power curve of the device; a maximum power was found of 1.35 mW which corresponds to a conversion efficiency of 1.35 per cent. Platinum was used here for convenience, but comparable results have been obtained with titanium or stainless steel as the conductive base. The absence of corrosion was proven by illuminating the cell with light of a 900 W Xenon lamp for a prolonged time. A quantity of current was passed, sufficient to corrode all of the CdSe present, hundreds of times over, and the performance of the electrode did not diminish. Moreover, the solution in the cell was analyzed for cadmium by means of its atomic absorption spectrum before and after the test, and no change in cadmium content could be observed (Mode B).

b. A solution was prepared containing 80 mg SeO₂ and 500 mg CdSO₄ in 25 ml of 1N H₂SO₄. A 1×2 cm piece of Ti sheet metal 0.8 mm thick was immersed in the solution after chemical etching by 5% HF in water and electrically connected to a cadmium stick immersed in the same solution. A current flowed between the two electrodes, and a layer of CdSe was formed on the Ti. After 10 minutes the Ti was removed from the solution and used as a photoelectrode in a PEC containing a solution of 6N KOH, 0.5 M Na₂S and 0.5 M S (Mode B). The auxiliary electrode was prepared by applying a paint consisting of 70 mg of Vulcan XC72R carbon, 300 mg of cobalt (II) acetate, 6 drops of Teflon suspension (Dupont Teflon 852/201), 2 drops of nonionic detergent (Nonic 218, Sharples), and 20 drops of water to half of 1×4 cm piece of stainless steel gauze (the unpainted half was used as an electrical lead-out). The painted gauze was sintered in an inert atmosphere at 300° C for 15 min. Upon immersion in the sulfide electrolyte, cobalt (II) sulfide is formed which is the major electrocatalytic agent. If instead of Co(II) acetate, Ni(II) acetate is used, NiS is obtained under the same conditions which has a comparable electrocatalytic activity to that of CoS. However, in this case, a slight blackening of the electrolyte is observed after some time when this electrode is used in the PEC, although no decrease in activity is observed.

Upon illumination with light comparable to sunlight, an open circuit voltage of 310 mV and a short circuit current of 1.3 mA were obtained.

A similarly prepared electrode, after it was heated for 10 min. in an argon atmosphere at 550° C, gave an open circuit voltage of 610 mV and a short circuit current of 9.6 mA/cm². If a similarly prepared CdSe layer is heated in a hydrogen atmosphere at 300° C for 15 min. instead of in argon, an electrode is obtained which gives an open circuit voltage of 430 mV and a short circuit current of 5 mA/cm$^2$. Immersion of this electrode in 6N HCl for several seconds increases the short circuit current to 8 mA/cm$^2$ without affecting the photovoltage (Mode B).

In none of the above examples was any corrosion observed.

EXAMPLE 2

A piece of thin zinc sheet of 1 gram was heated with 100 mg of Se in a sealed evacuated tube at 400° C for several hours. A lemon yellow coating of ZnSe was obtained on the zinc surface. This electrode was immersed in a solution 1M in S$^{--}$ and 10$^{-3}$M in S and connected with another electrode as in Example 1. Illumination under the conditions of Example 1 gave an open circuit voltage of 0.47V and a closed circuit current of 1 mA/cm$^2$. The absence of corrosion was proven as in Example 1 (Embodiment B).

EXAMPLE 3

Two Pt electrodes of 1 cm$^2$ each were immersed into 50 ml of 2N H$_2$SO$_4$, containing 1 g of Bi(NO$_3$)$_3$, and a current of 10 mA was passed for 10 minutes. The cathode which was covered with a black coating of Bi after this treatment was immersed into a solution, 1M in OH$^-$, S$^{--}$, and S and was anodized at 2V for one minute. The electrode thus obtained when illuminated under the conditions of Example 1 gave a closed circuit current of 0.35 mA/cm$^2$ and an open circuit voltage of 0.065V. No corrosion could be observed (Embodiment B).

EXAMPLE 4

A piece of cadmium metal of 4 grams was heated in a sealed evacuated tube, together with 100 mg of tellurium at 500° C for 12 hours. The cadmium was covered with a black layer of CdTe after this treatment. When illuminated under the conditions of Example 1, a closed circuit current of 8 mA/cm$^2$ was registered and an open circuit voltage of 0.28V. No corrosion could be observed (Embodiment B).

EXAMPLE 5

A CdSe electrode, prepared as in Example 1a was immersed in anhydrous methanol which was 1M in S$^{--}$ and 0.3M in S. No water was present. When illuminated under the conditions of Example 1a, a closed circuit current of 2.2 mA/cm$^2$ was registered, and an open circuit voltage of 0.3V. No corrosion could be observed (Embodiment B).

EXAMPLE 6

A CdS electrode on 1 cm$^2$ of conducting glass was prepared by spraying a solution, containing cadmium acetate and thiourea (approximately 0.1 M) onto the glass while it was heated at 250° C. It was then heated at 400° C for 15 minutes. This semitransparent electrode gave under illumination under the conditions of Example 1a, a closed circuit current of 1.8 mA and an open circuit voltage of 0.46V. A CdSe electrode on Pt of 0.5 cm$^2$ was prepared as described in Example 1a. This electrode when illuminated under the same conditions gave a closed circuit current of 1.5 mA and an open circuit voltage of 0.395V. Both electrodes were now connected according to Mode D$_1$ (FIG. 3a) with the transparent electrode in front (P$_A$). This combination gave a closed circuit current of 2.8 mA and an open circuit voltage of 0.435V. Therefore, this combination gives higher voltage than obtained with the CdSe alone and a higher current than that obtained with each of them alone (Embodiment D$_1$).

EXAMPLE 7 a. A cell was prepared as described in Example 1 (a), and a silver electrode was added, being a piece of porous silver (50% porosity), of 1 cm$^2$ surface and 1 mm thick. When the silver electrode was connected with the carbon electrode, an open circuit potential of 0.21V was registered. When it was connected with the CdSe electrode, an open circuit voltage of 0.25V of opposite sign was registered on illumination. The silver electrode was now short circuited with the carbon electrode until no current flow was found anymore. It was then connected with the CdSe electrode and light switched on which gave charging current of 7 mA. After an hour illumination the silver electrode was connected with the carbon electrode over a 68 Ohm load and a current of 3 mA was registered which shows that the cell is rechargeable with light. In order to get good storage efficiencies it is preferable to separate the silver electrode from the rest of the system by a cation specific membrane in which case storage efficiencies of more than 90% can be obtained (Embodiments A and C).

b. Two cells were prepared as in Example 1 (b) but with 2 cm$^2$ CdSe photoelectrodes and C/CoS auxiliary electrodes. In one of the cells a 400 mg piece of zinc foil was placed in a 2 ml compartment, separated from the photoelectrode and the auxiliary electrode by a cation specific membrane. The zinc foil compartment was filled with a 6N KOH solution, and the compartment containing the photoelectrode and the auxiliary electrode was filled with a solution 5.5N in KOH, 0.5N in Na$_2$S and 0.5N in S. The other cell contained a solution 6N in KOH, 0.5N in Na$_2$S, and 0.5N in S. The two cells were connected into a battery according to Mode F (FIG. 5) This battery delivered an open circuit voltage of 0.70V in the dark. Over a load of 10 ohms a steady current of 4mA was delivered which remained constant (within 10%) for 8 hrs. When light, simulating sunlight, was switched on, the same current could be drawn off while at the same time the battery was being charged. No rectifying device appeared to be necessary between the storage electrode and the photoactive electrodes (Embodiment F).

EXAMPLE 8

A cell was prepared as described in Example 1 (a). Separated from it by a cation specific membrane was a 1 ml compartment, containing a solution 1M in OH$^-$λ and S$^{--}$, and 0.5M in Se. In this compartment another carbon electrode was inserted. When the two carbon electrodes in the different compartments were connected, an open circuit potential of 0.08V was registered. When the electrode of the Se containing compartment was connected with CdSe electrode, an open circuit potential of 0.35V of opposite sign was registered on illumination. This cell delivered a steady dark current of 0.2 mA over a load of 68 Ohm and a charging current of 8 mA on illumination. Such a system is suitable when weak dark currents are needed over long dark periods and charging has to be rapid. Its characteristics can be changed by taking other soluble reversible redox systems of the right potential, like certain quinone-hydroquinone systems (Embodiment C).

EXAMPLE 9

Two photoelectrochemical cells were prepared, both having CdSe-coated electrodes on titanium sheet of 100 cm² surface, prepared by the electrolytic method, and porous carbon electrodes of the same surface area, being 5 mm thick. One cell contained 500 ml of a solution 1M in OH⁻, S⁻⁻ and S while the second one contained 400 ml of the same solution. This second cell had a second compartment of 100 ml, separated from the 400 ml compartment by a cation specific membrane. It was filled with an aqueous solution 1M in OH⁻ and S⁻⁻. Into this compartment was introduced a quantity of 5 g of thin tin foil which served as the storage electrode. The two cells were connected into a battery according to Mode F (FIG. 5). This battery delivered an open circuit voltage of 0.45V in the dark. Over a load of 10 ohms a steady current of 0.04A was delivered which stayed constant for 10 hours thus delivering 0.16Wh of electricity. When light, simulating sunlight was switched on, the same current could be taken off while also the battery was charged. One hour of illumination sufficed for a dark period of ten hours. No rectifying device appeared to be necessary between the storage electrode and the photoactive electrodes.

A capacity of 0.16 Wh per five grams of tin corresponds with about 1 Wh per 30 grams of tin. Comparable results could be obtained when instead of tin, copper, or lead was used (Embodiment F).

EXAMPLE 10

Figure 3B:
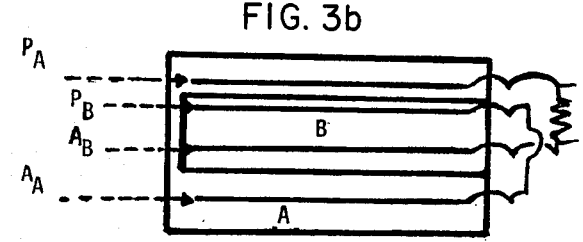

A 1 cm² $TiO_2$ photoelectrode on conducting glass was prepared by chemical vapour deposition (F. Mollers, H. J. Tolle and R. Memming, J. Electrochem. Soc. 121, 1160 {1974}). This electrode was immersed in a deaerated aqueous 1N KOH solution, together with a 2 cm long nickel wire of 0.6 mm diameter. A PEC comprising a 1 cm² CdSe photoelectrode and a 1 cm² C/CoS auxiliary electrode was prepared as in Example 1 (b). The four electrodes were connected as shown in Mode $D_2$ (FIG. 3b). Upon illumination hydrogen was evolved from the nickel wire and oxygen from the $TiO_2$ electrode when the double cell was connected in short circuit (Embodiment $D_2$).

EXAMPLE 11

A 1 cm² $WO_3$ photoelectrode on conducting glass was prepared by chemical vapour deposition through decomposition of $(NH_4)WO_3$ at 350° C in air. This electrode was connected to a platinized platinum gauze of 2 cm², and both electrodes were immersed in 1N $H_2SO_4$. To this cell was added a P.E.C. comprising a 1 cm² CdSe photoelectrode and a 1 cm² C/CoS auxiliary electrode, prepared as in Example 1 (b), according to Embodiment $D_4$. Upon illumination with light, simulating sunlight, the $WO_3$ cell gave an open circuit voltage of 380 mV and a short circuit current of 0.08 mA/cm². The CdSe cell gave an open circuit voltage of 620 mV and a short circuit current of 7.20 mA/cm². When this double cell was connected as in Embodiment $D_2$, an open circuit voltage of 990 mV and a short circuit current of 0.08 mA/cm² were obtained. When the double cell was connected as in Mode $D_3$, it gave an open circuit voltage of 615 mV and a short circuit current of 7.28 mA/cm² (Embodiments $D_3$ and $D_4$).

We claim:
1. A photo-electrochemical cell comprising as the photoactive electrode a semi-conductor of n- or p-type of suitable bandgap for efficient utilization of solar energy in combination with an additional electrode and an electrolyte comprising a chalcogenide redox couple chosen from S/S⁻⁻, Se/Se⁻⁻, and Te/Te⁻⁻.
2. A cell according to claim 1, wherein the semi-conductor electrode comprises a layer of photo-active semi-conductor material applied to an electrically conductive substrate.
3. A cell according to claim 2, wherein the active material of said the photoelectrode is chosen from CdS, $Bi_2S_3$, CdSe, CdTe, ZnSe, and $CuInS_2$.
4. A cell according to claim 1, wherein means are provided for preventing access of oxygen to the electrolyte system.
5. A cell according to claim 4, wherein the additional electrode is made of an inert material of high surface area.
6. A cell according to claim 4, wherein the additional electrode comprises carbon.
7. A cell according to claim 6, wherein the additional carbon electrode contains an electrocatalyst.
8. A cell according to claim 7, wherein said electrocatalyst is chosen from Pd, Co, and Ni salts.
9. A cell according to claim 8, wherein said electrocatalyst salt is on an electrochemically inert conducting base of stainless steel gauze.
10. A cell according to claim 4, wherein the photoactive electrode comprises a CdSe layer in contact with a S/S⁻⁻ containing aqueous or organic conducting electrolyte.
11. A cell according to claim 1, wherein the additional electrode is a storage electrode adapted to supply any part of the converted energy as electricity when the photoactive electrode is not illuminated.
12. A cell according to claim 9, wherein the storage electrode comprises a reversible redox system, having a redox potential between that of the redox couple in the electrolyte and the photopotential obtained on illumination.
13. A cell according to claim 11, wherein the storage electrode is adapted to undergo a reversible redox reaction.
14. A cell according to claim 11, wherein the storage electrode is in contact with an electrolyte containing a component adapted to undergo a reversible redox reaction, adapted to store electrical energy for subsequent use.
15. A cell according to claim 11, wherein the storage electrode is provided in a storage compartment separated from the electrolyte system of the electrodes by a cation-selective conducting partition.
16. A cell according to claim 11, wherein the storage electrodes and storage compartment solutions are as defined in Table 5.
17. A cell according to claim 1, wherein there is further provided a storage electrode as herein defined which is immersed in the electrolyte and which is electrically connected with the photoactive electrode.
18. A cell according to claim 17, wherein the connection between the storage electrode and the photoactive electrode is via means providing for current flow from the photoactive electrode to the storage electrode only.

* * * * *